(12) United States Patent
Aziz et al.

(10) Patent No.: US 7,200,315 B2
(45) Date of Patent: Apr. 3, 2007

(54) DYNAMIC FIBER SLACK MANAGEMENT FOR TELECOM RACKS

(75) Inventors: Farid Aziz, Kanata (CA); Michele Low, Nepean (CA); Peter Bortot, Osgoode (CA); Serge Fenkam, Trois-rivières (CA); Christopher Paci, Montreal (CA)

(73) Assignee: Nortel Networks Limited, Ottawa (CA)

( * ) Notice: Subject to any disclaimer, the term of this patent is extended or adjusted under 35 U.S.C. 154(b) by 203 days.

(21) Appl. No.: 10/863,922

(22) Filed: Jun. 9, 2004

(65) Prior Publication Data

US 2005/0276561 A1 Dec. 15, 2005

(51) Int. Cl.
G02B 6/00 (2006.01)
(52) U.S. Cl. .................. 385/135; 385/134; 385/136; 385/137
(58) Field of Classification Search .......... 385/134, 385/135, 137
See application file for complete search history.

(56) References Cited

U.S. PATENT DOCUMENTS

| | | | |
|---|---|---|---|
| 4,722,585 A * | 2/1988 | Boyer ................... | 385/135 |
| 4,792,203 A | 12/1988 | Nelson et al. | |
| 4,798,432 A | 1/1989 | Becker et al. | |
| 5,013,121 A | 5/1991 | Anton | |
| 5,208,894 A | 5/1993 | Johnson et al. | |
| 5,247,603 A * | 9/1993 | Vidacovich et al. ....... | 385/135 |
| 5,442,726 A * | 8/1995 | Howard et al. .......... | 385/135 |
| 5,717,811 A | 2/1998 | Macken | |
| 5,724,469 A * | 3/1998 | Orlando ................ | 385/135 |
| 5,913,006 A * | 6/1999 | Summach .............. | 385/134 |
| 6,304,707 B1 * | 10/2001 | Daems et al. .......... | 385/135 |
| 6,327,139 B1 * | 12/2001 | Champion et al. ....... | 361/608 |
| 6,349,894 B1 * | 2/2002 | Daoud et al. ........... | 242/399.2 |
| 6,353,696 B1 * | 3/2002 | Gordon et al. .......... | 385/135 |
| 6,360,050 B1 * | 3/2002 | Moua et al. ............ | 385/135 |
| 6,361,360 B1 * | 3/2002 | Hwang et al. .......... | 439/501 |
| 6,398,149 B1 * | 6/2002 | Hines et al. ........... | 242/399 |
| 6,504,988 B1 * | 1/2003 | Trebesch et al. ........ | 385/135 |
| 6,580,866 B2 * | 6/2003 | Daoud et al. .......... | 385/135 |
| 6,591,054 B2 * | 7/2003 | Afflerbaugh et al. ..... | 385/135 |
| 6,625,374 B2 | 9/2003 | Holman et al. | |
| 6,674,952 B2 * | 1/2004 | Howell et al. .......... | 385/135 |
| 6,715,619 B2 * | 4/2004 | Kim et al. ............. | 211/26 |
| 2002/0039476 A1 * | 4/2002 | Sauve et al. ........... | 385/134 |
| 2004/0228598 A1 * | 11/2004 | Allen et al. ........... | 385/135 |

* cited by examiner

*Primary Examiner*—Frank G. Font
*Assistant Examiner*—Guy G. Anderson
(74) *Attorney, Agent, or Firm*—Ridout & Maybee LLP

(57) ABSTRACT

Disclosed is an apparatus and method for managing and storing excess amounts of fiber-optic cable in a telecom rack. According to one embodiment, the apparatus comprises a fiber-optic cable slack take-up device attached to an arm. The arm is mounted to a supporting member attached to a side of the telecom rack and movable from a first stored position to a second deployed position. Access to the fiber-slack take-up device is provided by situating the arm in the second position. Situating the arm in the stored position places the slack take-up assembly, along with the excess fiber-optic cable, out of the way of operators working in the equipment aisle. Further embodiments provide means for safe-guarding the minimum bend radius of fiber-optic cable being used. The apparatus and method are useful for overcoming the space requirements of in-rack fiber storage systems known in the art.

18 Claims, 3 Drawing Sheets

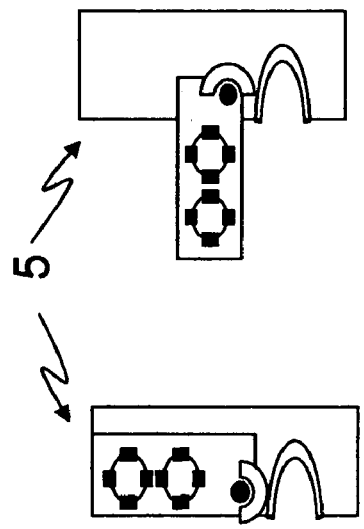
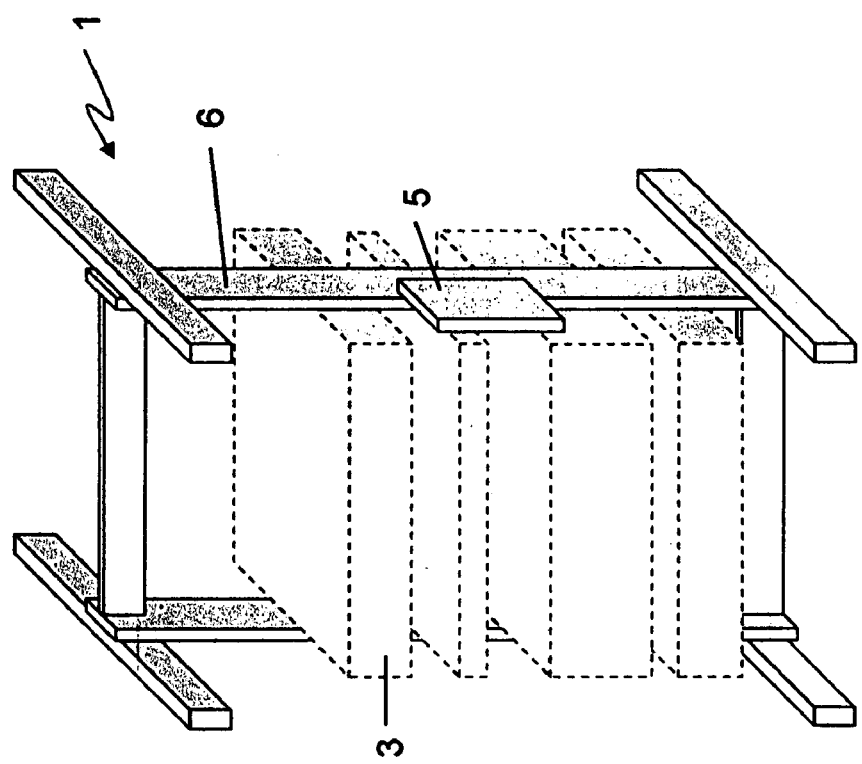
FIGURE 1

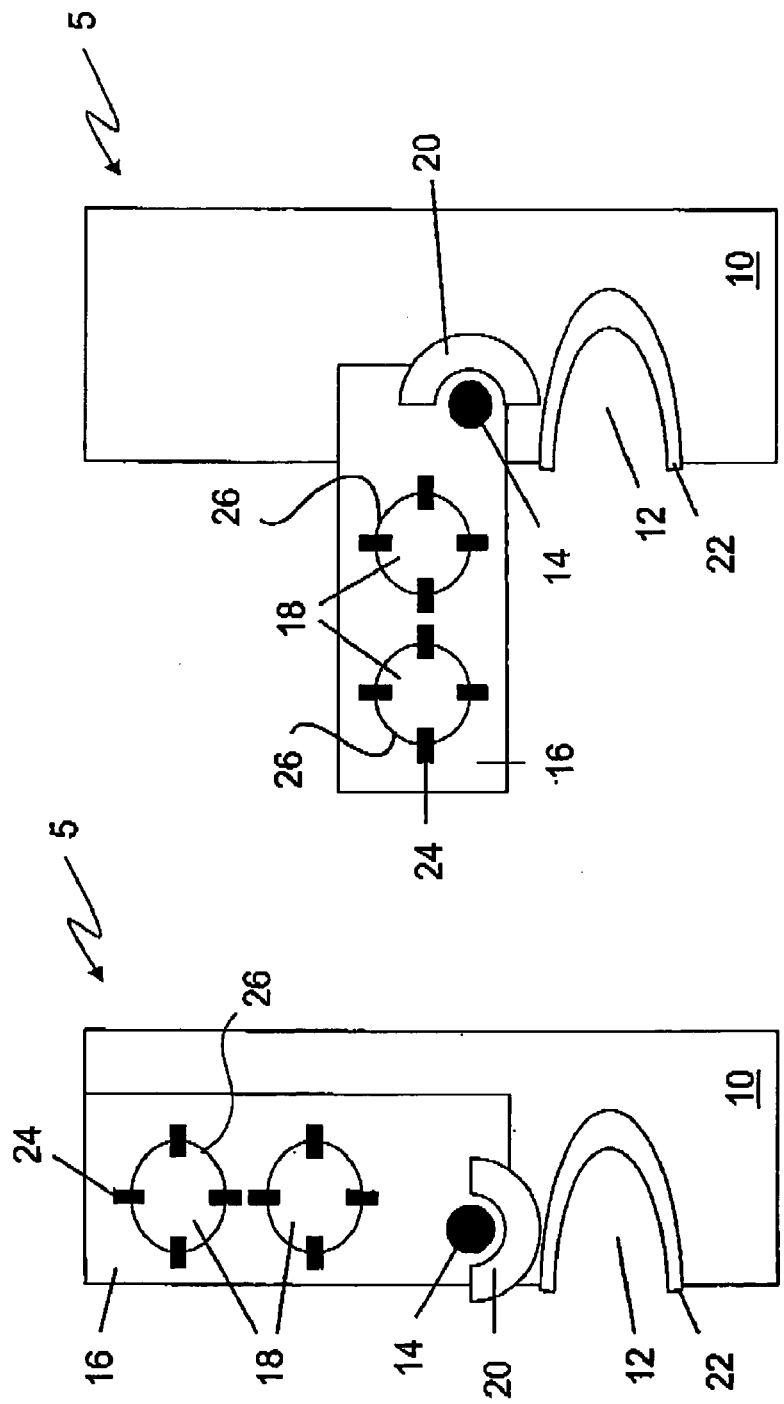

DYNAMIC FIBER SLACK MANAGEMENT FOR TELECOM RACKS

FIELD OF THE INVENTION

This invention relates to signal transmission systems in which signals are carried through fiber-optic cables. More particularly, this invention pertains to an apparatus and method for managing and storing excess amounts of fiber-optic cable in a telecom rack.

BACKGROUND OF THE INVENTION

The increased use of optical fiber transmission in the telecommunications industry has resulted in a need for the development and installation of fiber-optic transmission systems.

Typically, telecom racks are situated in rows in telecom offices, and define equipment aisles. Telecom racks are used to hold and organize the many telecom equipment components that are required for fiber-optic transmission systems. A great deal of engineering goes into the design of telecom racks in order to combine the most number of components into the least amount of space, while preserving a level of organization, efficiency of use, and maintainability.

Fiber-optic networks require numerous techniques for managing and connecting a large number of fiber-optic cables. The lengths of fiber-optic cables, unlike their copper-based counterparts, are carefully calibrated and therefore the cables themselves are not designed to be shortened or extended by trimming excess cable or splicing together additional cable. Rather, fiber-optic cable is purchased in predetermined lengths, with connectors that have been installed in the factory. Field workers must utilize these predetermined lengths of cable, in performing necessary interconnection tasks. When both ends of a fiber-optic cable are connected to equipment at two separate points, a certain amount of slack cable is created, due to the use of predetermined lengths of cable.

Excess amounts of fiber-optic cable must be stored in a neat and orderly manner, to ensure that fiber-optic network interconnections are readily accessible, removable, and replaceable. Ideally, any slack cable should be contained within a limited amount of space, preferably as close to the termination points as possible. At the same time, there may be occasions when it is necessary to provide slack or excess amounts of fiber-optic cable lengths.

Fiber-optic cable is generally comprised of a light conducting inner core, and a flexible protective outer shell. Care must be taken in its installation and use, since the inner core elements of fiber-optic cables are generally small, brittle and may be easily damaged. Excessive bending of a fiber-optic cable can cause signal loss, reduce the life expectancy of the cable, or even break the inner core of the cable. Each fiber-optic cable has a characteristic minimum bend radius below which light transmission is unacceptably impaired. Moreover, bending below the minimum bend radius may also damage or break the fiber-optic cable. Therefore, a fiber-optic system must be configured so as to ensure that the minimum bend radius is respected in whatever storage arrangements are employed.

Fiber-optic networks and other cable networks including copper based networks require numerous techniques for managing and connecting a large number of cables. Devices for storing excess amounts of fiber-optic cables are known in the art. For example, U.S. Pat. No. 6,625,374 to Holman et al. issued Sep. 23, 2003, and U.S. Pat. No. 5,013,121 to Anton et al. issued May 7, 1991, teach cable storing apparatuses which include a cable spool for holding excess lengths of cable. In addition, U.S. Pat. No. 4,792,203 to Nelson et al. issued Dec. 20, 1988 teaches an optical fiber distribution apparatus which includes a spool for holding excess fiber from a trunk cable. Similarly, U.S. Pat. No. 4,798,432 to Becker et al. dated Jan. 17, 1989 teaches a storage container for a section of an optical fiber. In addition, U.S. Pat. No. 5,717,811 to Macken dated Feb. 10, 1998 teaches an optical fiber organizer. Similarly, U.S. Pat. No. 5,208,894 to Johnson et al. dated May 4, 1993 teaches a fiber optic splice cabinet featuring optical fiber take-up spools. Furthermore, U.S. Pat. No. 5,913,006 to Summach dated Jun. 15, 1999 discloses a retractable panel for managing and storing optical fibers.

Not withstanding advances made in the art, there is a continuing need for improvement in cable storage devices. A shortcoming in the existing art is the space requirement of in-rack fiber storage systems, space which could otherwise be used for electronic equipment.

SUMMARY OF THE INVENTION

The present invention provides an apparatus and method for improved storage and management of excess amounts of fiber-optic cable for a telecom rack while utilizing minimal space within the telecom rack itself.

According to a first aspect of the present invention there is disclosed an embodiment of an apparatus for managing excess fiber-optic cable for use on a telecom rack. The apparatus comprises a fiber-optic cable slack take-up device attached to an arm. The arm is mounted to a supporting member connected to a side portion of the telecom rack and movable between a first stored position to a second deployed position. Access to the fiber-slack take-up device is provided by situating the arm in the second deployed position.

Advantageously the arm, along with the excess fiber-optic cable, is clear of the equipment aisle when located in the first stored position and provides an operator with access to the fiber-slack take-up assembly when located in the second deployed position.

As another advantage, the fiber-slack take-up assembly holds the excess fiber-optic cable such that all bends imposed on said cable have a bend radius equal to or greater than the minimum bend radius of the fiber-optic cable being used. It is contemplated that the fiber-slack take-up assembly may be a spool or spaced apart radius limiting brackets, or a combination thereof.

Conveniently under some circumstances it is useful to have multiple fiber-slack take-up assemblies attached to the arm.

Advantageously the supporting member may be attached to a side frame member of the telecom rack or to a side surface of a telecom equipment component.

Also convenient under some circumstances is the use of a fiber pass-through means located on a side surface of a telecom equipment component for the passage of fiber-optic cables from their points of connection to the fiber-slack take-up assembly. Furthermore, it may be beneficial to use the fiber pass-through means in conjunction with a fiber spout attached inside the fiber pass-through means whereby the fiber spout provides a minimum bend radius for the fiber-optic cable and protects against abrasion of the fiber-optic cable as the cable traverses the pass-through means.

Advantageously there is also provided a guard attached to the arm at a position proximate the attachment means, the guard having a surface with a radius of curvature greater than a minimum allowed bend radius for said fiber-optic cable for guiding said fiber when the arm is moved from the first stored position to the second deployed position.

As yet another advantage, the fiber-slack take-up assembly comprises retention pins for preventing the fiber-optic cable from slipping off the slack take-up assembly. Furthermore, it may be beneficial to ensure that the retention pins are rotatably mounted to the slack take-up assembly, the retention pins being located in a first position to retain the fiber-optic cable relative to the fiber-slack take-up means, rotatable to a second position to facilitate removal and addition of fiber-optic cable.

Conveniently under some circumstances it is useful to employ an attachment means that pivotally connects said arm to said supporting member. In other circumstances it may be more convenient to employ an attachment means that slidably connects the arm to the supporting member.

According to another aspect of the invention, there is disclosed a method for storing excess amounts of fiber-optic cable in a telecom rack, the method including the steps of:

(1) providing an apparatus for managing excess fiber-optic cable for use on a telecom rack, said apparatus comprising: a supporting member mounted to a side portion of said telecom rack; an attachment means connected to said supporting member; an arm connected to the attachment means, the arm having a first stored position, and a second deployed position and movable therebetween; and a fiber-slack take-up assembly attached to the arm; whereby the arm is movable from said first stored position to said second deployed position allowing access to the fiber-slack take-up assembly for storing the excess fiber-optic cable;

(2) positioning the arm from the first, stored, position to the second, deployed, position;

(3) routing the excess fiber-optic cable to the fiber-slack take-up assembly;

(4) positioning excess fiber-optic cable onto the fiber-slack take-up assembly;

(5) positioning the arm from the second, deployed, position to the first, stored, position; and (6) storing excess fiber-optic cable on the fiber-slack take-up assembly.

BRIEF DESCRIPTION OF THE DRAWINGS

In order that the invention may be more clearly understood and more readily carried into effect, exemplary embodiments of the invention will now be described with reference to the accompanying drawings in which:

FIG. 1 is a diagram illustrating a telecom rack with the apparatus for fiber-slack management in place according to an embodiment of the present invention;

FIG 2 is a diagram illustrating the apparatus for fiber slack management in a telecom rack with the arm situated in the first, stored, position according to an embodiment of the present invention;

FIG. 3 is a diagram illustrating the apparatus for fiber slack management in a telecom rack with the arm situated in the second, deployed, position according to an embodiment of the present invention; and, FIG. 4 shows an alternative embodiment of the apparatus for fiber slack management in a telecom rack having bend radius limiting brackets.

DETAILED DESCRIPTION

Figure 4:
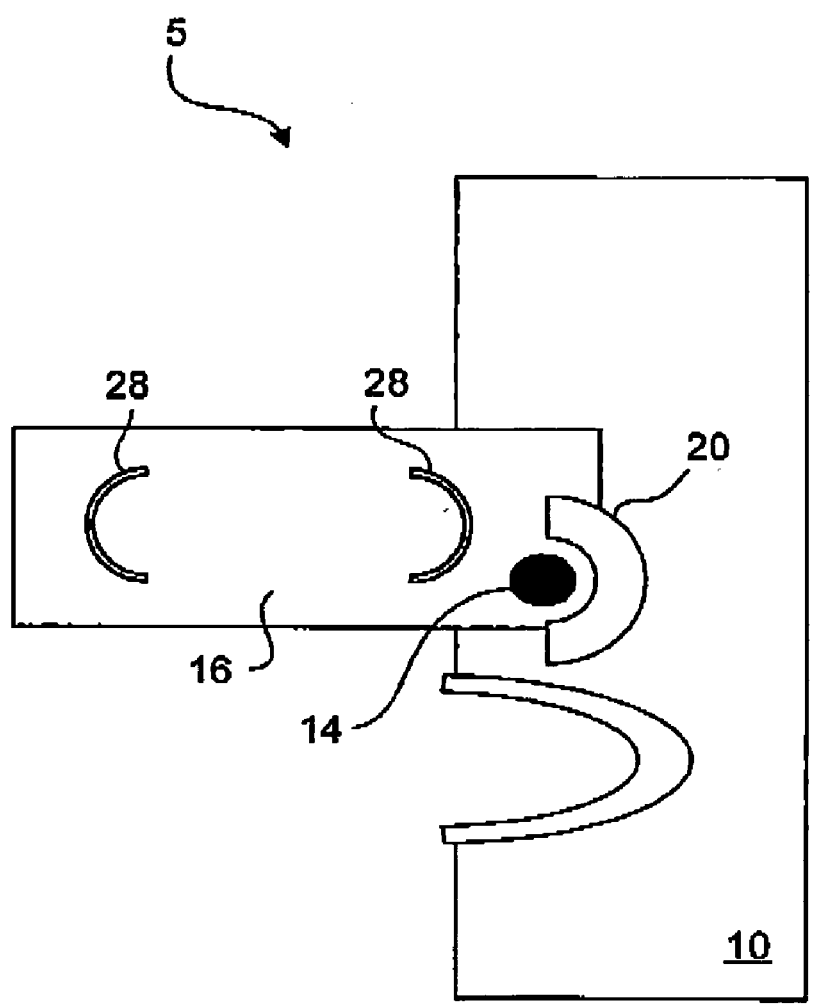

The present invention will now be described in more detail with reference to exemplary embodiments thereof as shown in the appended drawings. While the present invention is described below including preferred embodiments, it should be understood that the present invention is not limited thereto. Those of ordinary skill in the art having access to the teachings herein will recognize additional implementations, modifications, and embodiments which are within the scope of the present invention as disclosed and claimed herein. In the figures, like elements are given like reference numbers.

Referring now to FIG. 1, there is illustrated a typical telecom rack 1 containing an array of telecommunication equipment components 3. Also illustrated is an apparatus 5 for fiber slack management in a telecom rack 1, mounted to a side frame member 6 of the telecom rack 1.

Referring to FIG. 2, there is illustrated an embodiment of an apparatus 5 for fiber slack management in a telecom rack 1. According to this figure the apparatus 5 is in a stored position. The apparatus 5 includes an arm 16 which is attached to a supporting member 10 by way of an attachment means 14 that allows the arm 16 to move between a first stored position as shown in FIG. 2 and a second deployed position which is depicted in FIG. 3. In moving between these two positions the arm 16 swings, in one plane, from a position that is substantially parallel with the supporting member 10 to a position that is substantially perpendicular to the supporting member 10. Attached to the arm 16 is one or a plurality of fiber-slack take-up assemblies 18. When the arm 16 is located in the first stored position the fiber-slack take-up assemblies are out of the equipment aisle. Moving the arm 16 to the second deployed position facilitates access to the fiber-slack take-up assemblies 18.

The attachment means 14 connecting the arm 16 to the supporting member 10 may be a pivot joint which allows the arm 16 to rotate about the pivot point. However, the attachment means 14 may also be a sliding mechanism allowing the arm 16 to slide between a first stored and a second deployed position that extends into the equipment aisle.

According to another embodiment of the invention, a guard 20 is used to prevent the minimum bend radius of the fiber-optic cable from being exceeded at the location of the attachment means 14 as the arm 16 is moved from the first position to the second position. The guard 20 has an outside radius of curvature equal to or greater than the minimum bend radius of the fiber-optic cable and is mounted to the arm 16 at a point that is on the side of the attachment means 14 that is opposite to the fiber-slack take-up assembly 18. The guard will maintain a minimum bend in the fiber-optic cable as the arm 16 is moved from the first stored to the second deployed position as tension in the cable forces the fiber-optic cable to follow the outside curvature of the guard.

According to yet another embodiment of the invention, a fiber pass-through means 12 is located on a side surface 4 of a telecom equipment component 3 for facilitating the routing of fiber-optic cables to the slack take-up assembly 18. The fiber pass-through means 12 is a passage in the side surface 4 of said telecom equipment component 3 large enough to allow fiber-optic cables to pass through to the fiber-slack take-up assembly 18. The telecom equipment component 3 may be a shelf closure assembly or a sidewall of an equipment shelf.

According to yet another embodiment of the invention, a fiber spout 22 is mounted to the edge defining the fiber pass-through means 12. The fiber spout 22 is constructed with a non-abrasive surface of a material such as plastic with a radius of curvature equal to or greater than the minimum bend radius of the fiber-optic cable being used. With the fiber spout 22 in place fiber-optic cable passing through the fiber pass-through means 12 will be prevented from bending below its minimum bend radius, and protected from equipment corners and edges as it travels through to the fiber-slack take-up assembly 18.

According to a contemplated embodiment of the invention, the fiber-slack take-up assembly 18 is a spool 26 with a radius that is greater than the minimum bend radius of the fiber-optic cable being used. However, the fiber-slack take-up assembly 18 may be any device that is capable of storing excess fiber-optic cable, such as a matched pair of spaced apart convex bend radius limiting brackets 28, as shown in FIG. 4. The bend radius limiting brackets 28 may be positioned such that the convex portions face away from each other. These bend radius limiting brackets 28 are aligned such that the minimum bend radius of the fiber-optic cable is not exceeded when used to store excess fiber-optic cable. Furthermore, it is contemplated that the fiber-slack take-up assembly 18 comprises a plurality of bend radius limiting brackets 28 or a combination of spools 26 and bend radius limiting brackets 28 arranged such that the minimum bend radius of the fiber-optic cable is not exceeded when used to store excess fiber-optic cable.

It is also contemplated that the fiber slack take-up assembly 18 may be equipped with rotatably mounted retention pins 24. The retention pins 24 extend outward past the edge of the fiber-slack take-up assembly 18 when in a first position to retain the fiber-optic cable on the fiber-slack take-up assembly 18. The retention pins 24 can be rotated out of the way past the edge of the fiber-slack take-up assembly 18 into a second position, facilitating loading and unloading of fiber-optic cable.

In use the arm 16 is positioned to the second deployed position as depicted in FIG. 3 providing an operator with access to the fiber-slack take-up assembly 18. The operator then routes excess fiber-optic cable from connections within the telecom rack 1 to the fiber-slack take-up assembly 18. In embodiments featuring a pivoting attachment means 14 excess fiber-optic cable is routed from connections within the telecom rack 1 around the attachment means 14 to the fiber-slack take-up assembly 18. This will prevent appreciable tension or relief from being imposed on the fiber-optic cable when the arm 16 is moved to or from the first stored position. Excess fiber-optic cable is then positioned onto the fiber-slack take-up assembly 18. The operator moves the arm to the first stored position depicted in FIG. 2 thereby keeping the equipment aisle clear of excess fiber-optic cable. The excess fiber-optic cable is stored on the fiber-slack take-up assembly 18 until the operator needs to access the fiber-slack take-up assembly 18 to manage the excess fiber-optic cable.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. An apparatus for managing excess fiber-optic cable for use on a telecom rack, said apparatus comprising:
a supporting member mounted to a side portion of said telecom rack; an arm pivotally connected to the supporting member, the arm having a vertical stored position, and a horizontal deployed position and pivotally movable in a vertical plane there between; and
a fiber-slack take-up assembly attached to the arm, whereby the arm is pivotally movable from said vertical stored position to said horizontal deployed position allowing access to the fiber-slack take-up assembly for storing the excess fiber-optic cable, and wherein the fiber-slack take-up assembly comprises a spool with a radius of curvature greater than the minimum bend radius of the fiber-optic cable being used.

2. An apparatus as claimed in claim 1 wherein at the vertical stored position the arm is clear of an equipment aisle and at the horizontal deployed position the arm provides an operator access to the fiber-slack take-up assembly.

3. An apparatus as claimed in claim 1 wherein the fiber-slack take-up assembly supports the excess fiber-optic cable such that all bends imposed on said cable have a bend radius equal to or greater than the minimum bend radius of the fiber-optic cable being used.

4. An apparatus for managing excess fiber-optic cable for use on a telecom rack, said apparatus comprising:
a supporting member mounted to a side portion of said telecom rack; an arm pivotally connected to the supporting member, the arm having a vertical stored position, and a horizontal deployed position and pivotally movable in a vertical plane there between; and a fiber-slack take-up assembly attached to the arm, whereby the arm is pivotally movable from said vertical stored position to said horizontal deployed position allowing access to the fiber-slack take-up assembly for storing the excess fiber-optic cable, and wherein the fiber-slack take-up assembly comprises a matched pair of spaced apart convex bend radius limiting brackets positioned such that the convex portions face away from each other, said bend radius limiting brackets being aligned such that the minimum bend radius of the fiber-optic cable is not exceeded.

5. An apparatus as claimed in claim 4 further comprising at least one additional convex bend radius limiting bracket positioned such that the convex portion faces away from at least one other bend radius limiting bracket, said bend radius limiting bracket being aligned in relation to at least one other bend radius limiting bracket such that the minimum bend radius of the fiber-optic cable is not exceeded.

6. An apparatus as claimed in claim 1 further comprising at least one additional fiber-slack take-up assembly attached to said arm.

7. An apparatus as claimed in claim 1 wherein the supporting member is attached to a side frame member of the said telecom rack.

8. An apparatus as claimed in claim 1 wherein the supporting member is attached to a side surface of a telecom equipment component.

9. An apparatus as claimed in claim 1 further comprising a fiber pass-through means located on a side surface of a telecom equipment component for the passage of fiber-optic cables from their points of connection to the fiber-slack take-up means.

10. An apparatus as claimed in claim 9 wherein said fiber pass-through means further comprises a fiber spout wherein said fiber spout provides a minimum bend radius for the fiber optic-cable and protects against abrasion of the fiber-optic cable as the cable traverses said fiber pass-through means.

11. An apparatus as claimed in claim 1 further comprising a guard attached to the arm at a position proximate the attachment means, the guard having a surface with a radius of curvature greater than a minimum allowed bend radius for said fiber-optic cable for guiding said fiber when the arm is moved from the first stored position to the second deployed position.

12. An apparatus as claimed in claim 1 wherein the fiber-slack take-up assembly comprises retention pins for preventing the fiber-optic cable from slipping off the fiber-slack take-up assembly.

13. An apparatus as claimed in claim 12 wherein the retention pins are rotatably mounted to the fiber-slack take-up assembly, the retention pins having in a first position to retain the fiber-optic cable relative to the fiber-slack take-up means, and a second position to facilitate removal and addition of fiber-optic cable.

14. A method for managing excess fiber-optic for use on a telcom rack, said method comprising the steps of:
(1) providing an apparatus for managing excess fiber-optic cable for use on a telecom rack, said apparatus comprising:
a supporting member mounted a side portion of said telecom rack; an arm pivotally connected to the supporting member, the arm having a vertical stored position, and a horizontal deployed position and pivotally movable in a vertical plane there between; and
a fiber-slack take-up assembly attached to the arm, wherein the fiber-slack take-up assembly comprises an assembly selected from a spool with a radius of curvature greater than the minimum bend radius of the fiber-optic cable being used and a matched pair of spaced apart convex bend radius limiting brackets positioned such that the convex portions face away from each other, said bend radius limiting brackets being aligned such that the minimum bend radius of the fiber-optic cable is not exceeded; whereby the arm is pivotally movable from said vertical stored position to said horizontal deployed position allowing access to the fiber-slack take-up assembly for storing the excess fiber-optic cable;
(2) positioning the arm to the horizontal deployed position;
(3) routing the excess fiber-optic cable to the fiber-slack take-up assembly
(4) positioning excess fiber-optic cable onto the fiber-slack take-up assembly; and
(5) positioning the arm from to the vertical stored position.

15. An apparatus as claimed in claim 4 further comprising at least one additional fiber-slack take-up assembly attached to said arm.

16. An apparatus as claimed in claim 4 wherein the fiber-slack take-up assembly supports the excess fiber-optic cable such that all bends imposed on said cable have a bend radius equal to or greater than the minimum bend radius of the fiber-optic cable being used.

17. An apparatus as claimed in claim 4 wherein the fiber-slack take-up assembly comprises retention pins for preventing the fiber-optic cable from slipping off the fiber-slack take-up assembly.

18. An apparatus as claimed in claim 4 wherein the supporting member is attached to a side frame member of the said telecom rack.

* * * * *